(12) United States Patent
Lynam (10) Patent No.: US 10,027,930 B2
(45) Date of Patent: Jul. 17, 2018

(54) SPECTRAL FILTERING FOR VEHICULAR DRIVER ASSISTANCE SYSTEMS

(71) Applicant: MAGNA ELECTRONICS INC., Auburn Hills, MI (US)

(72) Inventor: Niall R. Lynam, Holland, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 1034 days.

(21) Appl. No.: 14/229,061

(22) Filed: Mar. 28, 2014

(65) Prior Publication Data

US 2014/0293042 A1     Oct. 2, 2014

Related U.S. Application Data

(60) Provisional application No. 61/806,674, filed on Mar. 29, 2013.

(51) Int. Cl.
| | |
|---|---|
| *B60R 1/00* | (2006.01) |
| *G01J 3/51* | (2006.01) |
| *H04N 7/18* | (2006.01) |
| *G01J 3/02* | (2006.01) |
| *G01J 3/28* | (2006.01) |
| *G01J 3/36* | (2006.01) |

(52) U.S. Cl.
CPC ............. *H04N 7/183* (2013.01); *B60R 1/00* (2013.01); *G01J 3/0205* (2013.01); *G01J 3/0291* (2013.01); *G01J 3/2803* (2013.01); *G01J 3/51* (2013.01)

(58) Field of Classification Search
CPC ........ H04N 7/183; G05D 1/0244; B60R 1/00; B60R 21/01538; B60R 2300/8093; G01J 3/36; G01J 3/2803; G01J 3/51
See application file for complete search history.

(56) References Cited

U.S. PATENT DOCUMENTS

| | | |
|---|---|---|
| 3,971,065 A | 7/1976 | Bayer |
| 4,720,790 A | 1/1988 | Miki et al. |
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |

(Continued)

OTHER PUBLICATIONS

DigInfo TV Website Printout: http://www.diginfo.tv/v/13-0021-r-en.php, "Double the brightness in low light photos with Panasonic's new color filtering technology", Mar. 28, 2013.

*Primary Examiner* — Obafemi Sosanya
(74) *Attorney, Agent, or Firm* — Honigman Miller Schwartz and Cohn, LLP (57) ABSTRACT

A vision system of a vehicle includes an imaging array and a spectral filter disposed at the imaging array. The imaging array includes a two dimensional array of photosensing pixels. The spectral filter includes a deflection color microsplitting configuration. The deflection microsplitting spectral filters are disposed in front of a pixel of a respective sub-array of a plurality of sub-arrays and not disposed in front of other pixels of the respective sub-array. The imaging array captures image data for use in a driver assistance system of the vehicle.

20 Claims, 6 Drawing Sheets

(56) References Cited

U.S. PATENT DOCUMENTS

| | | |
|---|---|---|
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield |
| 5,204,778 A | 4/1993 | Bechtel |
| 5,208,701 A | 5/1993 | Maeda |
| 5,245,422 A | 9/1993 | Borcherts et al. |
| 5,255,442 A | 10/1993 | Schierbeek et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,497,306 A | 3/1996 | Pastrick |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,610,756 A | 3/1997 | Lynam et al. |
| 5,614,788 A | 3/1997 | Mullins |
| 5,619,370 A | 4/1997 | Guinosso |
| 5,632,092 A | 5/1997 | Blank et al. |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,715,093 A | 2/1998 | Schierbeek et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,765,118 A | 6/1998 | Fukatani |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,357 A | 3/1999 | Sivashankar et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |
| 5,923,027 A | 7/1999 | Stam et al. |
| 5,924,212 A | 7/1999 | Domanski |
| 5,959,555 A | 9/1999 | Furuta |
| 5,963,247 A | 10/1999 | Banitt |
| 5,986,796 A | 11/1999 | Miles |
| 5,990,469 A | 11/1999 | Bechtel et al. |
| 5,990,649 A | 11/1999 | Nagao et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,097,024 A | 8/2000 | Stam et al. |
| 6,100,799 A | 8/2000 | Fenk |
| 6,144,022 A | 11/2000 | Tenenbaum et al. |
| 6,175,300 B1 | 1/2001 | Kendrick |
| 6,178,034 B1 | 1/2001 | Allemand et al. |
| 6,201,642 B1 | 3/2001 | Bos et al. |
| 6,223,114 B1 | 4/2001 | Boros et al. |
| 6,227,689 B1 | 5/2001 | Miller |
| 6,250,148 B1 | 6/2001 | Lynam |

(56) References Cited

U.S. PATENT DOCUMENTS

| | | |
|---|---|---|
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,291,812 B1 | 9/2001 | Bechtel et al. |
| 6,294,989 B1 | 9/2001 | Schofield et al. |
| 6,297,781 B1 | 10/2001 | Turnbull et al. |
| 6,310,611 B1 | 10/2001 | Caldwell |
| 6,313,454 B1 | 11/2001 | Bos et al. |
| 6,317,057 B1 | 11/2001 | Lee |
| 6,320,282 B1 | 11/2001 | Caldwell |
| 6,333,759 B1 | 12/2001 | Mazzilli |
| 6,341,523 B2 | 1/2002 | Lynam |
| 6,353,392 B1 | 3/2002 | Schofield et al. |
| 6,370,329 B1 | 4/2002 | Teuchert |
| 6,392,315 B1 | 5/2002 | Jones et al. |
| 6,396,397 B1 | 5/2002 | Bos et al. |
| 6,411,204 B1 | 6/2002 | Bloomfield et al. |
| 6,420,975 B1 | 7/2002 | DeLine et al. |
| 6,424,273 B1 | 7/2002 | Gutta et al. |
| 6,430,303 B1 | 8/2002 | Naoi et al. |
| 6,442,465 B2 | 8/2002 | Breed et al. |
| 6,477,464 B2 | 11/2002 | McCarthy et al. |
| 6,497,503 B1 | 12/2002 | Dassanayake et al. |
| 6,498,620 B2 | 12/2002 | Schofield et al. |
| 6,516,664 B2 | 2/2003 | Lynam |
| 6,534,884 B2 | 3/2003 | Marcus et al. |
| 6,539,306 B2 | 3/2003 | Turnbull |
| 6,547,133 B1 | 4/2003 | DeVries, Jr. et al. |
| 6,553,130 B1 | 4/2003 | Lemelson et al. |
| 6,574,033 B1 | 6/2003 | Chui et al. |
| 6,589,625 B1 | 7/2003 | Kothari et al. |
| 6,594,583 B2 | 7/2003 | Ogura et al. |
| 6,611,610 B1 | 8/2003 | Stam et al. |
| 6,636,258 B2 | 10/2003 | Strumolo |
| 6,650,455 B2 | 11/2003 | Miles |
| 6,672,731 B2 | 1/2004 | Schnell et al. |
| 6,674,562 B1 | 1/2004 | Miles |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjönell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,806,452 B2 | 10/2004 | Bos et al. |
| 6,819,231 B2 | 11/2004 | Berberich et al. |
| 6,823,241 B2 | 11/2004 | Shirato et al. |
| 6,824,281 B2 | 11/2004 | Schofield et al. |
| 6,847,487 B2 | 1/2005 | Burgner |
| 6,850,156 B2 | 2/2005 | Bloomfield et al. |
| 6,882,287 B2 | 4/2005 | Schofield et al. |
| 6,889,161 B2 | 5/2005 | Winner et al. |
| 6,909,753 B2 | 6/2005 | Meehan et al. |
| 6,946,978 B2 | 9/2005 | Schofield |
| 6,968,736 B2 | 11/2005 | Lynam |
| 6,975,775 B2 | 12/2005 | Rykowski et al. |
| 6,989,736 B2 | 1/2006 | Berberich et al. |
| 7,004,606 B2 | 2/2006 | Schofield et al. |
| 7,005,974 B2 | 2/2006 | McMahon et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,116,246 B2 | 10/2006 | Winter et al. |
| 7,123,168 B2 | 10/2006 | Schofield |
| 7,136,753 B2 | 11/2006 | Samukawa et al. |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,195,381 B2 | 3/2007 | Lynam et al. |
| 7,202,776 B2 | 4/2007 | Breed |
| 7,227,611 B2 | 6/2007 | Hull et al. |
| 7,338,177 B2 | 3/2008 | Lynam |
| 7,365,769 B1 | 4/2008 | Mager |
| 7,370,983 B2 | 5/2008 | De Wind et al. |
| 7,460,951 B2 | 12/2008 | Altan |
| 7,480,149 B2 | 1/2009 | DeWard et al. |
| 7,490,007 B2 | 2/2009 | Taylor et al. |
| 7,492,281 B2 | 2/2009 | Lynam et al. |
| 7,526,103 B2 | 4/2009 | Schofield et al. |
| 7,566,851 B2 | 7/2009 | Stein et al. |
| 7,581,859 B2 | 9/2009 | Lynam |
| 7,592,928 B2 | 9/2009 | Chinomi et al. |
| 7,639,149 B2 | 12/2009 | Katoh |
| 7,681,960 B2 | 3/2010 | Wanke et al. |
| 7,720,580 B2 | 5/2010 | Higgins-Luthman |
| 7,724,962 B2 | 5/2010 | Zhu et al. |
| 7,777,611 B2 | 8/2010 | Desai |
| 7,855,755 B2 | 12/2010 | Weller et al. |
| 7,881,496 B2 | 2/2011 | Camilleri et al. |
| 7,914,187 B2 | 3/2011 | Higgins-Luthman et al. |
| 7,952,490 B2 | 5/2011 | Fechner et al. |
| 7,965,336 B2 | 6/2011 | Bingle et al. |
| 7,972,045 B2 | 7/2011 | Schofield et al. |
| 7,994,462 B2 * | 8/2011 | Schofield ............ G05D 1/0244 250/208.1 |
| 8,013,780 B2 | 9/2011 | Lynam et al. |
| 8,017,898 B2 | 9/2011 | Lu et al. |
| 8,027,029 B2 | 9/2011 | Lu et al. |
| 8,058,977 B2 | 11/2011 | Lynam |
| 8,256,821 B2 | 9/2012 | Lawlor et al. |
| 8,340,866 B2 | 12/2012 | Hanzawa et al. |
| 8,376,595 B2 | 2/2013 | Higgins-Luthman |
| 8,446,470 B2 | 5/2013 | Lu et al. |
| 8,849,495 B2 | 9/2014 | Chundrlik, Jr. et al. |
| 2002/0015153 A1 | 2/2002 | Downs |
| 2002/0044065 A1 | 4/2002 | Quist et al. |
| 2002/0113873 A1 | 8/2002 | Williams |
| 2003/0137586 A1 | 7/2003 | Lewellen |
| 2003/0222982 A1 | 12/2003 | Hamdan et al. |
| 2004/0114381 A1 | 6/2004 | Salmeen et al. |
| 2005/0078389 A1 | 4/2005 | Kulas et al. |
| 2005/0134983 A1 | 6/2005 | Lynam |
| 2005/0264891 A1 | 12/2005 | Uken et al. |
| 2006/0018511 A1 | 1/2006 | Stam et al. |
| 2006/0018512 A1 | 1/2006 | Stam et al. |
| 2006/0061008 A1 | 3/2006 | Karner et al. |
| 2006/0091813 A1 | 5/2006 | Stam et al. |
| 2006/0103727 A1 | 5/2006 | Tseng |
| 2006/0164221 A1 | 7/2006 | Jensen |
| 2006/0250501 A1 | 11/2006 | Wildmann et al. |
| 2006/0290479 A1 | 12/2006 | Akatsuka et al. |
| 2007/0024879 A1 | 2/2007 | Hamilton et al. |
| 2007/0104476 A1 | 5/2007 | Yasutomi et al. |
| 2007/0145273 A1 | 6/2007 | Chang |
| 2008/0043099 A1 | 2/2008 | Stein et al. |
| 2009/0093938 A1 | 4/2009 | Isaji et al. |
| 2009/0113509 A1 | 4/2009 | Tseng et al. |
| 2009/0177347 A1 | 7/2009 | Breuer et al. |
| 2009/0243824 A1 | 10/2009 | Peterson et al. |
| 2009/0244361 A1 | 10/2009 | Gebauer et al. |
| 2009/0265069 A1 | 10/2009 | Desbrunes |
| 2009/0295181 A1 | 12/2009 | Lawlor et al. |
| 2010/0020170 A1 | 1/2010 | Higgins-Luthman et al. |
| 2010/0097469 A1 | 4/2010 | Blank et al. |
| 2010/0228437 A1 | 9/2010 | Hanzawa et al. |
| 2012/0044066 A1 | 2/2012 | Mauderer et al. |
| 2012/0062743 A1 | 3/2012 | Lynam et al. |
| 2012/0218412 A1 | 8/2012 | Dellantoni et al. |
| 2012/0245817 A1 | 9/2012 | Cooprider et al. |
| 2012/0262340 A1 | 10/2012 | Hassan et al. |
| 2012/0303222 A1 | 11/2012 | Cooprider et al. |

(56) References Cited

U.S. PATENT DOCUMENTS

| | | |
|---|---|---|
| 2013/0124052 A1 | 5/2013 | Hahne |
| 2013/0129150 A1 | 5/2013 | Saito |
| 2013/0131918 A1 | 5/2013 | Hahne |
| 2014/0022390 A1 | 1/2014 | Blank et al. |
| 2014/0067206 A1 | 3/2014 | Pflug |
| 2014/0156157 A1 | 6/2014 | Johnson et al. |
| 2014/0222280 A1 | 8/2014 | Salomonsson |
| 2014/0313339 A1 | 10/2014 | Diessner et al. |
| 2014/0379233 A1 | 12/2014 | Chundrlik, Jr. et al. |

\* cited by examiner

Micro Color Splitting

SPECTRAL FILTERING FOR VEHICULAR DRIVER ASSISTANCE SYSTEMS

CROSS REFERENCE TO RELATED APPLICATION

The present application claims the filing benefits of U.S. provisional application Ser. No. 61/806,674, filed Mar. 29, 2013, which is hereby incorporated herein by reference in its entirety.

FIELD OF THE INVENTION

The present invention relates generally to cameras and displays and, more particularly, to a vehicle vision system.

BACKGROUND OF THE INVENTION

A variety of spectral filters are known and are used for forward-facing imagers used for vision-based based driver assistance systems (DAS) in vehicles for likes of headlamp control systems, lane monitoring systems, traffic sign detection systems and forward collision warning systems (such as those disclosed in U.S. Pat. Nos. 7,566,851; 5,796,094; 6,882,287; 5,837,994; and/or 6,291,812, and/or U.S. Pat. Publication No. US-2008/0043099, and/or International Publication No. WO 2009/046268, which are hereby incorporated by reference herein in their entireties). While such known spectral filtering works well in such DAS applications, scope exists for improvement.

SUMMARY OF THE INVENTION

Improved spectral filtering is provided for likes of forward facing imagers used in vehicular driver assistance systems. The forward facing imagers comprises an array of photosensing elements/pixels such as is disclosed in U.S. Pat. No. 5,796,094, which is hereby incorporated by reference herein in its entirety.

The vision system includes a camera disposed behind a windshield of a vehicle, with the camera comprising a lens and an imaging array. The camera views forward of the vehicle and through the windshield of the vehicle. The imaging array captures image data. The imaging array comprises a two dimensional array of columns and rows of photosensing pixels, with the two dimensional array comprising a plurality of sub-arrays, and with each of the sub-arrays comprising at least first, second and third pixels, and with the first pixel adjacent the second pixel and the second pixel is adjacent the third pixel. Light emanating from light sources external the equipped vehicle passes through the windshield of the vehicle to be imaged by the camera. Such external light imaged at the sub-arrays via the lens of the camera. A deflection microsplitting spectral filter is disposed in front of the second pixel of the sub-array and a deflection microsplitting spectral filter is not disposed in front of the first and third pixels of the sub-array. White light incident at the lens passes through the deflection microsplitting spectral filter and is split so that (i) light within a first spectral band is imaged at the first pixel of the sub-array, (ii) light within a second spectral band is imaged at the second pixel of the sub-array and (iii) light within a third spectral band is imaged at the third pixel of the sub-array. A vehicle control includes an image processor, which is operable to process image data captured by the imaging array. Responsive to processing of captured image data, the control is operable to control a driver assistance system of the equipped vehicle.

In one embodiment, red light and blue light deflectors are arranged diagonally, with one of each for every four pixels of the photosensor array of the forward-facing imager used. Spectral values can be obtained by determining the intensity of light (that passes through whatever spectral filter type is in front of each pixel) reaching each of the four pixels.

These and other objects, advantages, purposes and features of the present invention will become apparent upon review of the following specification in conjunction with the drawings.

DESCRIPTION OF THE PREFERRED EMBODIMENTS

Figure 1:
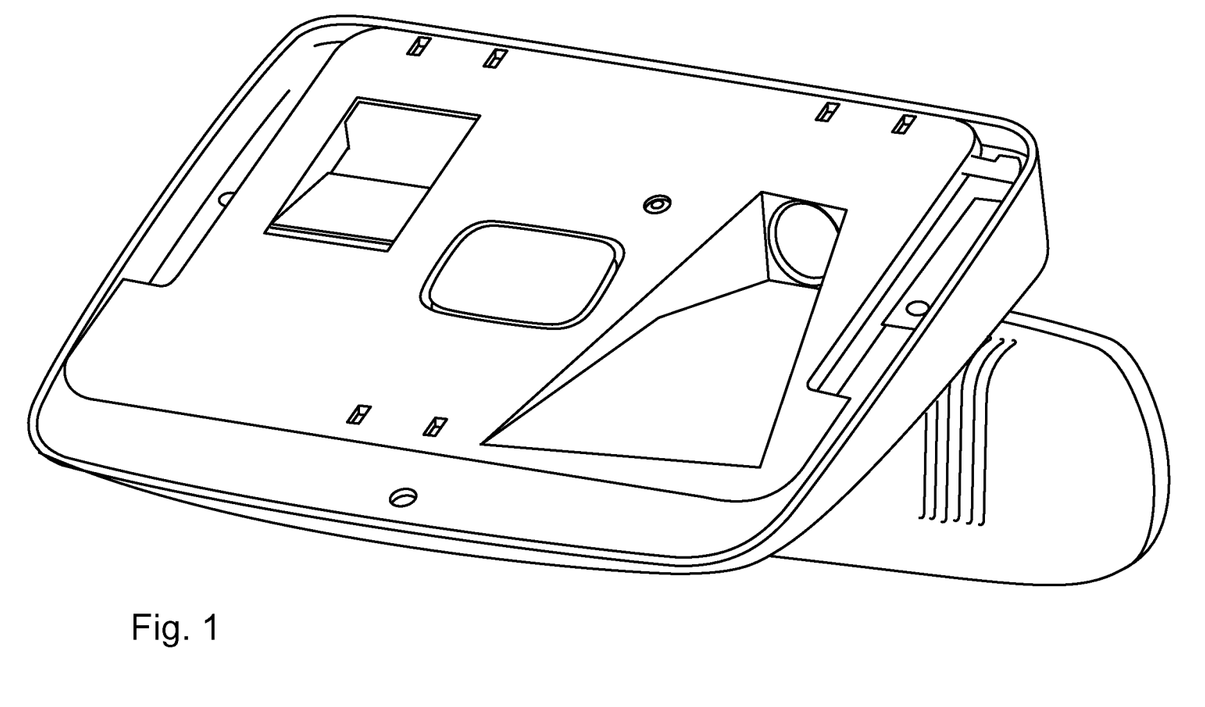
FIG. 1 is a perspective view of a windshield electronics module housing a camera in accordance with the present invention.

Referring now to the accompanying drawings there is illustrated in FIG. 1 an accessory module, generally indicated as 10, for mounting against a windshield of a vehicle. The system comprises an accessory module assembly 12 and, in the preferred embodiment illustrated, a mirror assembly 14 detachably connected to the module assembly 12 in substantially conventional fashion. It will however be appreciated from the following description that the mirror assembly 14 does not form an essential element of the invention, and the system 10 could be provided without the mirror assembly 14. The module assembly 12 could be designed to be seated against or partially surrounding an existing mirror assembly mounted directly to the vehicle windscreen. The module houses a forward facing imager (FFI) or camera that is housed at or supported at the accessory module and has a forward field of view through the windshield of the vehicle. The accessory module or windshield electronics module may comprise any suitable module or mounting structure, such as by utilizing aspects of the systems described in U.S. Pat. Nos. 8,256,821; 6,824,281; and/or 6,690,268, which are hereby incorporated herein by reference in their entireties.

Figure 2:
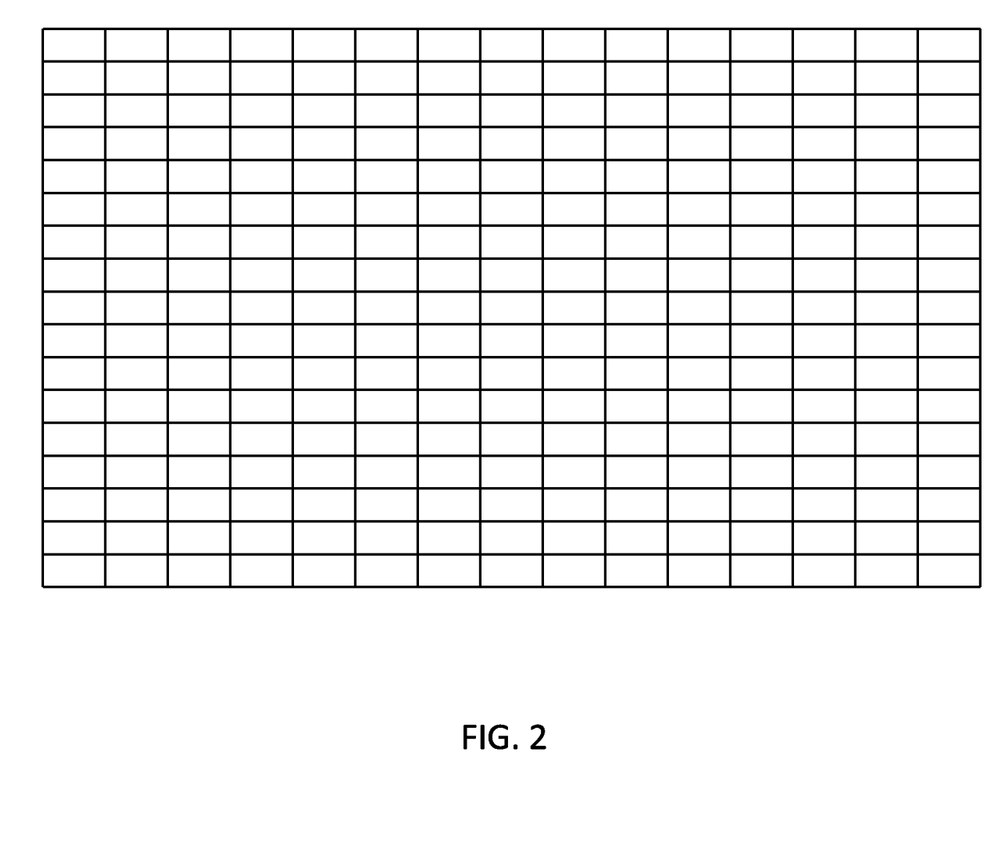
FIG. 2 is a schematic of an imaging array suitable for use with the present invention.

The forward facing imager or camera may comprise any suitable type of imager, such as a camera having a two dimensional array of photosensing pixels, such as a CMOS imager or the like, such as utilizing aspects of the systems described in U.S. Pat. Nos. 6,396,397; 5,877,897; 5,796,094; 5,760,962; 5,715,093; 5,670,935; and/or 5,550,677, which are hereby incorporated herein by reference in their entireties. As shown in FIG. 2, the imaging array of the camera comprises a two dimensional array of photosensing elements or pixels comprising a plurality of rows and columns of photosensing pixels.

The forward facing imager or imaging array captures image data, which is processed by an image processor of a control of the vision system. The control, responsive to image processing of image data captured by the imaging array of the forward facing camera, may be operable to, for example, provide an output to or control of a driver assistance system of the equipped vehicle. For example, the control, responsive at least in part to processing of captured image data, may (i) control the headlamps of the vehicle, (ii) provide a lane departure warning function of the vehicle, (iii) provide an adaptive cruise control function of the vehicle, (iv) provide a traffic sign recognition function of the vehicle, (v) provide a forward collision warning function of the vehicle, (vi) provide a collision mitigation braking function of the vehicle, (vii) provide an automatic emergency braking function of the vehicle, (viii) provide a pedestrian detection function of the vehicle, (ix) provide an object detection function of the vehicle, (x) provide a traffic driving control function of the vehicle and (xi) provide an output to a video display of the vehicle, such as for a surround view system of the vehicle, and/or the like.

In the illustrated embodiment, the camera is disposed at or behind the windshield of the vehicle, and views forward of the vehicle and through the vehicle windshield, behind a portion of the vehicle windshield that is swept by a windshield wiper of a windshield wiping system of the equipped vehicle. The camera comprises a lens and an imager or imaging array (such as an imaging array established at a printed circuit board or element). The imaging array comprises a plurality of rows and columns of photosensing pixels, and is operable to capture image data representative of color images of the scene forward of the vehicle and in the field of view of the camera.

Figure 3:
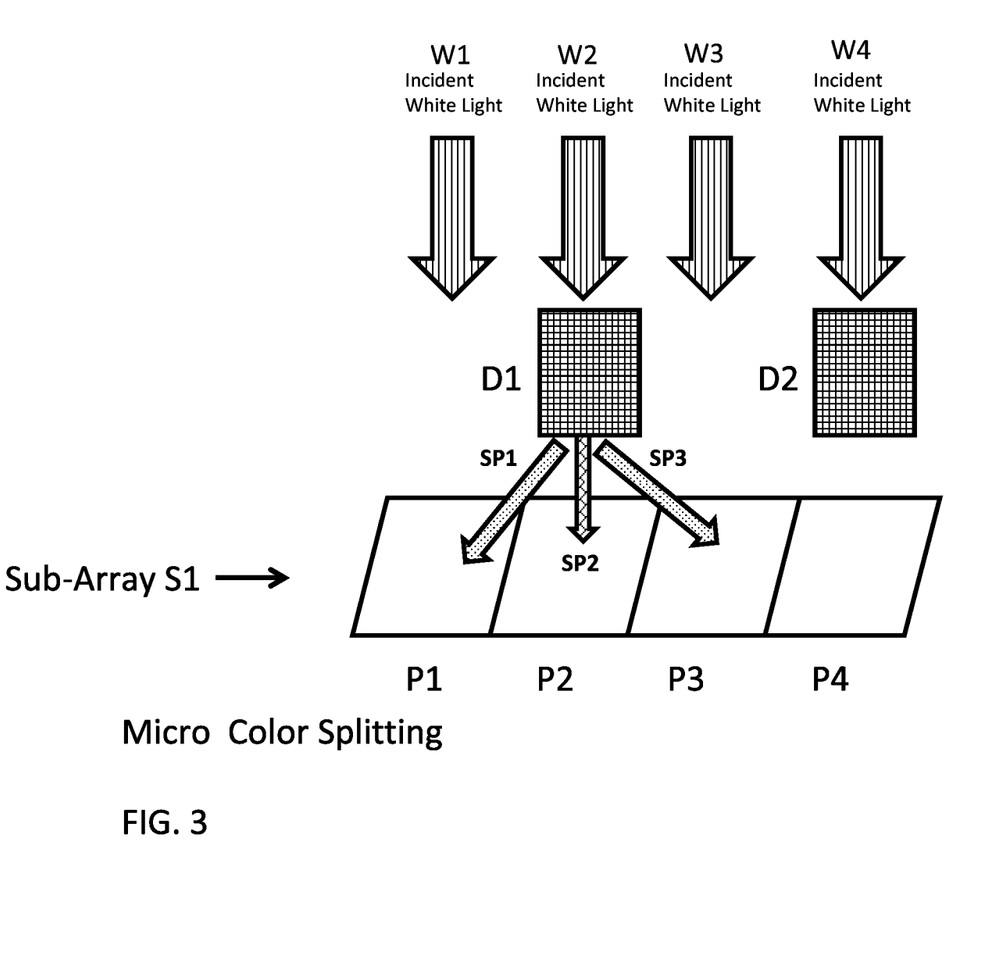
FIG. 3 is a schematic of a micro color splitting system for use with a driver assistance system of the present invention.

Referring now to FIG. 3, sub-array S1 comprises at least three photosensing elements, such as four photosensing elements/pixels P1, P2, P3, P4. White light (W1, W2, W3, W4) is incoming from the scene exterior to the equipped vehicle being viewed by the imaging sensor/camera. D1 and D2 are deflection micro splitting spectral filters. For example, D1 can be a red deflector. With a red deflector, incoming white light W2 is split by D1 into red light SP1 (deflected such as by refraction to be incident on pixel P1) and into red light SP3 (deflected such as by refraction to be incident on pixel P3). Undeflected/non-refracted light SP2 (such as blue and green light—cyan) is incident on pixel P2. Incoming white light W1 is also incident on pixel P1 and incoming white light W3 is also incident on pixel P3 (because there is not any filter or deflector disposed in front of pixels P1 and P3 of sub-array S1). D2 may also be a red deflector that deflects or splits light into red light onto pixel P3 and onto a fifth pixel (not shown), with undeflected/non-refracted light (such as blue and green light or cyan light) may be incident on pixel P4.

Optionally, and alternately, D1 can be a blue deflector, whereupon incoming white light W2 is split by D1 into blue light SP1 (deflected such as by refraction to be incident on pixel P1) and into blue light SP3 (deflected such as by refraction to be incident on pixel P3), and undeflected/non-refracted light SP2 (such as red and green light—yellow) is incident on pixel P2, and with incoming white light W1 also incident on pixel P1 and incoming white light W3 also incident on pixel P3 (because there is not any filter or deflector disposed in front of pixels P1 and P3 of sub-array S1). More than two deflectors can be used (such as four deflectors) to enhance S/N ratio, such as is disclosed at http://www.diginfo.tv/v/13-0021-r-en.php. Wave optics analysis can be used, such as by using Babibet-BPM from Panasonic Corporation of Osaka, Japan. The deflectors D1, D2, etc. may comprise the same light splitting construction. Optionally, more than one type of spectral deflector can be used—for example, D1 can be a red deflector and D2 can be a blue deflector.

Figure 4:
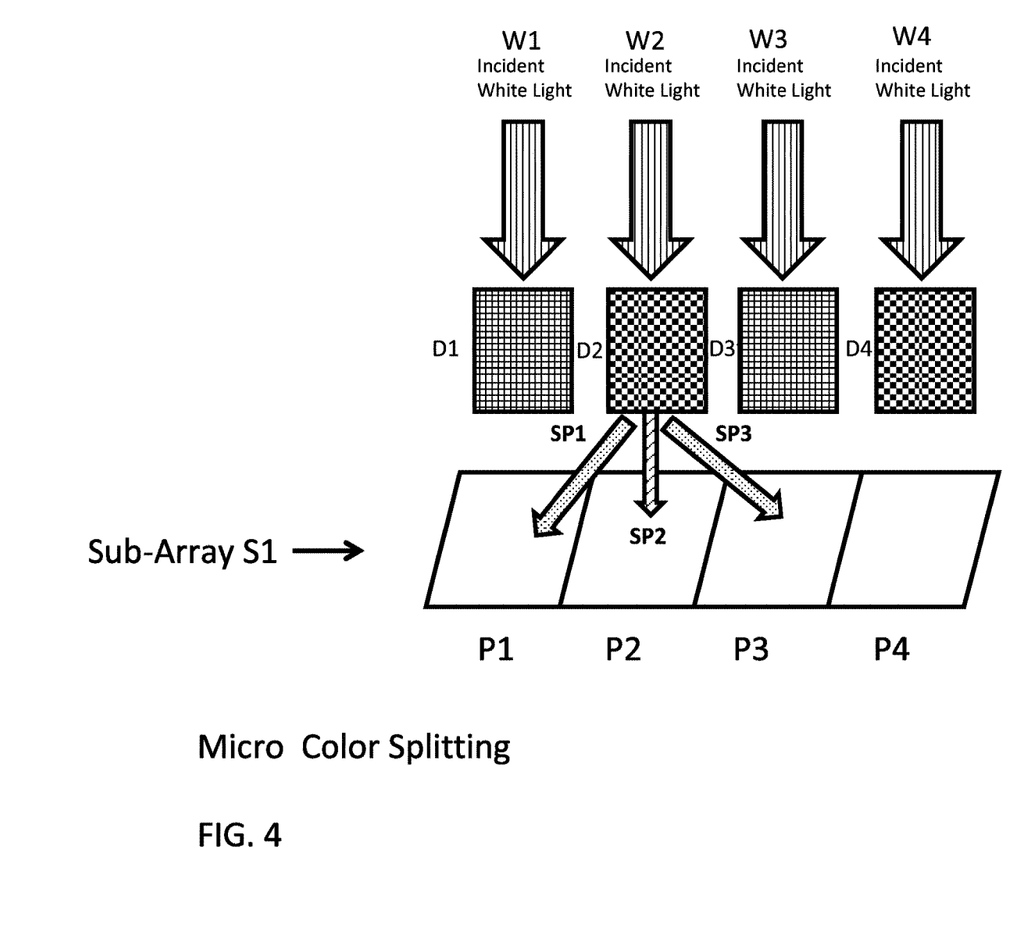
FIG. 4 is a schematic of another micro color splitting system for use with a driver assistance system of the present invention.

Referring now to FIG. 4, each pixel may be associated with a respective light splitter. For example, light arriving at pixels P1 and P3 passes through red deflectors or filters D1 and D3 (respectively) and light arriving at pixels P2 and P4 passes through blue deflectors or filters D2 and D4 (respectively).

Figure 5:
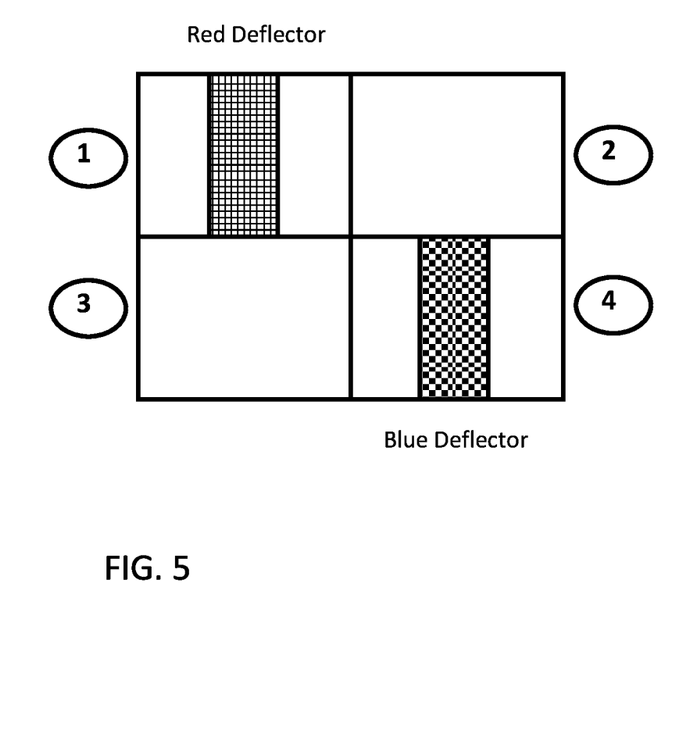
FIG. 5 is a schematic of a splitting system having a red deflector and a blue deflector.

Referring now to FIG. 5, a red deflector is arranged/disposed in front of pixel #1 and a blue deflector is disposed in front of pixel #4. No filter/deflector is arranged/disposed in front of either pixel #2 or pixel #3. Thus, and as shown in FIG. 5, white light W (R+G+B) is directly incident on pixels #2 and #3. Cyan light (G+B) is incident on pixel #1 and yellow light (R+G) is incident on pixel #4. Additionally, and due to deflection of red light by the red deflector in front of pixel #1 and due to deflection of blue light by the blue deflector in front of pixel #4, additional red light is incident on pixel #2 and additional blue light is incident on pixel #3.

Thus, and such as illustrated in FIG. 5, red and blue deflectors are arranged diagonally, with one of each for every four pixels. The red and blue deflectors are arranged diagonally, with one of each for every four pixels. RGB values can be obtained by determining the intensity of light reaching each of the four pixels. For example, if white light enters each pixel, pixels where it doesn't pass through a deflector receive unmodified white light. However, in pixels with a red deflector, the light is split into red diffracted light and cyan non-diffracted light. And when white light passes through a blue deflector, the light is split into blue diffracted light and yellow non-diffracted light. As a result, the pixel arrangement is cyan, white+red, white+blue, and yellow. The RGB values are then calculated using a processing technique designed specifically for mixed color signals.

Figure 6:
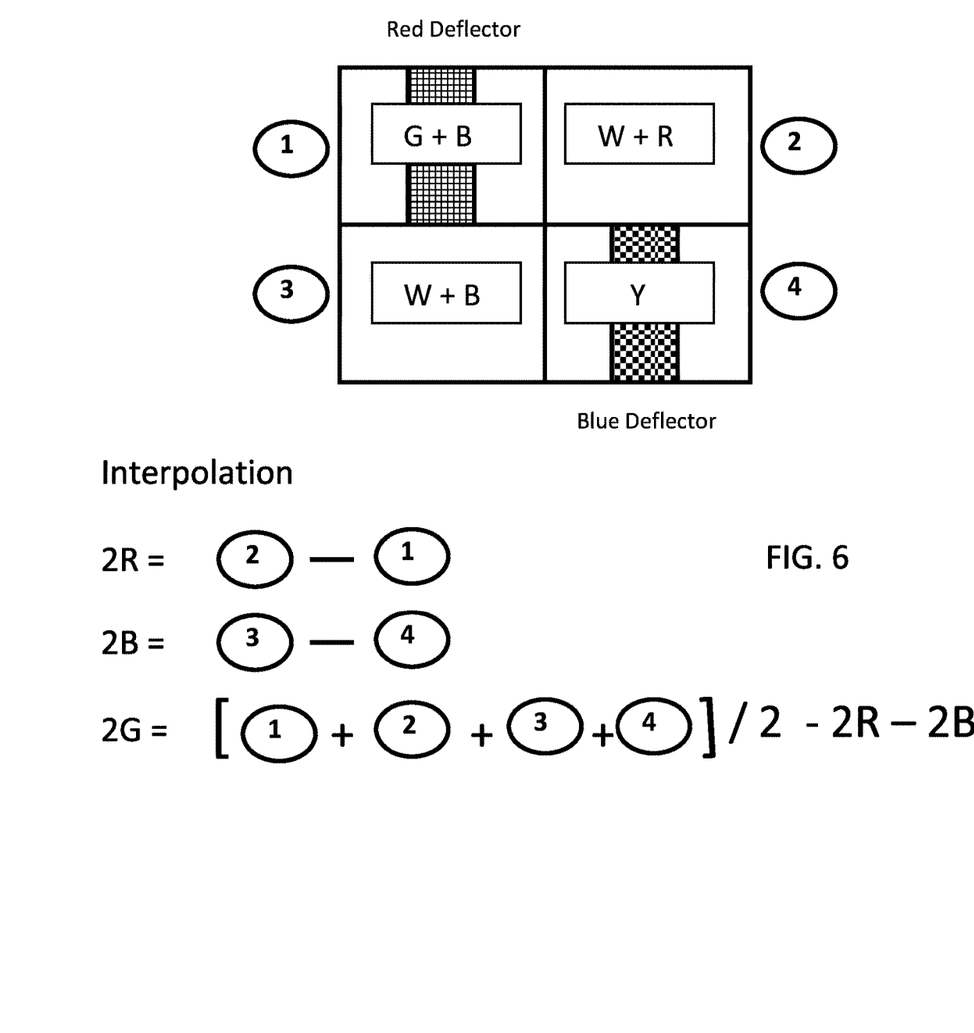
FIG. 6 is a schematic of the splitting system of FIG. 6, showing an interpolation method suitable for use with the present invention.

As illustrated in FIG. 6, an interpolation method is used to generate the appropriate RGB values from the light intensities measured at the respective individual pixels. Computational methods are used to arrive at the RGB values taking into account, in 3D, optical phenomena such as refraction, reflection and diffraction. As a consequence of use of red and blue deflectors, such as illustrated in the figures and discussed above, and as a consequence of the computational-intent interpolation where light intensities measured at the respective pixels are mathematically manipulated, such as shown in FIG. 6, up to twice the light sensitivity, as compared to that achieved with a conventional RGB filter, is achieved by simultaneously delivering true to life, high quality color or rendition.

Other spectral filtering can be utilized in conjunction with and/or as an alternative to the micro color-splitting described above. In addition to Bayer filtering such as is disclosed in U.S. Pat. No. 3,971,065 (which is hereby incorporated by reference herein in its entirety), Panchromatic spectral filtering (such as is disclosed in U.S. Publication Nos. US-2007/0145273 and US-2007/0024879, which are hereby incorporated by reference herein in their entireties) can be used. Additionally, a Fujifilm "EXR" color filter array and/or a Fujifilm "X-Trans" filter (both available from Fujifilm Corporation, Tokyo, Japan) can be used.

The present invention enables enhanced performance of automotive color video cameras, such as are used in rear backup systems and/or multi-camera surround view systems of vehicles. Performance is particularly enhanced under low light conditions, such as experienced by the cameras at dusk or when operating such cameras at night. Conventional color cameras, utilizing the likes of a Bayer RGB color filter or the like, necessarily reduce the amount of light actually impinging the photosensor elements of the multi-pixel imaging arrays (preferably CMOS imaging arrays) typically used. Use of a deflection micro-splitting spectral filter in accordance with the present invention mitigates and substantially reduces such filtering of light viewed by the subject automotive camera that passes through the lens of that camera and that is spectrally split/filtered by the deflection micro-splitting spectral filter prior to being imaged on the imaging array of the camera.

In accordance with the present invention, enhanced performance for FFI DAS features (such as automatic headlamp control, such as utilizing aspects of the systems described in U.S. Pat. Nos. 5,796,094; 7,004,606; 7,972,045; 8,017,898; 8,376,595, which are hereby incorporated by reference herein in their entireties) can be achieved, and especially at night under low ambient lighting conditions.

Optionally, aspects of the present invention may be suitable for use in other vehicle imaging systems or vision systems, such as, for example, backup assist systems, such as systems utilizing aspects of the systems described in U.S. Pat. Nos. 5,670,935; 6,717,610; and/or 5,550,677, and/or International Publication No. WO 2012/051500, which are hereby incorporated by reference herein in their entireties.

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO2012/075250; WO 2013/019795; WO 2012/075250; WO 2012/145822; WO 2013/081985; WO 2013/086249; and/or WO 2013/109869, and/or U.S. patent application Ser. No. 13/333,337, filed Dec. 21, 2011, which are hereby incorporated herein by reference in their entireties.

The camera may comprise a charge-coupled device (CCD) image sensor, a complementary metal-oxide-semiconductor (CMOS) image sensor, or any other suitable type of image sensor. For example, the camera and/or imaging device and/or control and/or image processor may comprise any suitable components, and may utilize aspects of the cameras and vision systems described in U.S. Pat. Nos. 7,965,336; 7,937,667; 7,720,580; 7,480,149; 7,339,149; 7,123,168; 7,005,974; 7,004,606; 7,038,577; 6,946,978; 6,922,292; 6,831,261; 6,822,563; 6,806,452; 6,757,109; 6,717,610; 6,824,281; 6,806,452; 6,690,268; 6,590,719; 6,559,435; 6,498,620; 6,396,397; 6,353,392; 6,320,176; 6,313,454; 6,201,642; 6,097,023; 5,877,897; 5,796,094; 5,760,962; 5,715,093; 5,670,935; and/or 5,550,677, and/or International Publication Nos. WO 2010/099416; WO 2011/028686; WO/2009/036176; WO/2009/046268; WO 2013/016409, and/or U.S. patent applications, Ser. No. 13/534,657, filed Jun. 27, 2012; Ser. No. 12/508,840, filed Jul. 24, 2009; and/or Ser. No. 13/260,400, filed Sep. 26, 2011, and/or U.S. Publication Nos. US-2009-0244361 and/or US-2010-0020170; which are hereby incorporated herein by reference in their entireties.

A display may configured to be positioned inside the cabin of the vehicle. The display can include an in-vehicle display panel situated in the dashboard of the vehicle. The display may comprise a backlit liquid-crystal display (LCD) panel, a light-emitting diode (LED) display panel, an organic LED (OLED) display panel, an active-matrix organic LED (AMOLED) display panel, or the like, as well as a circuit to drive the display panel with a video signal received from the processing system. The display may include a touch-screen interface to control how the video is displayed by, for example, outputting a mode signal to the processing system.

The display may, for example, utilize aspects of the video displays (that may be disposed at a vehicle console or instrument panel or at an interior rearview mirror assembly of the vehicle) described in U.S. Pat. Nos. 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; and/or 6,642,851; 5,530,240; 6,329,925; 7,855,755; 7,626,749; 7,581,859; 7,446,924; 7,446,650; 7,370,983; 7,338,177; 7,274,501; 7,255,451; 7,195,381; 7,184,190; 5,668,663; and/or 5,724,187, and/or U.S. patent application Ser. No. 13/333,337, filed Dec. 21, 2011, and/or U.S. Publication Nos. US-2006-0061008 and/or US-2006-0050018, which are all hereby incorporated herein by reference in their entireties.

Optionally, the video display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display a compass heading or directional heading character or icon (or other icon or indicia or displayed images) when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580; and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle. Optionally, the image processor may utilize aspects of the systems described in U.S. Pat. No. 7,697,027, which is hereby incorporated herein by reference in its entirety.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592, and/or U.S. patent applications, Ser. No. 14/191,512, filed Feb. 27, 2014; Ser. No. 14/183,613, filed Feb. 19, 2014; Ser. No. 14/169,329, filed Jan. 31, 2014; Ser. No. 14/169,328, filed Jan. 31, 2014; Ser. No. 14/163,325, filed Jan. 24, 2014; Ser. No. 14/159,772, filed Jan. 21, 2014; Ser. No. 14/107,624, filed Dec. 16, 2013; Ser. No. 14/102,981, filed Dec. 11, 2013; Ser. No. 14/102,980, filed Dec. 11, 2013; Ser. No. 14/098,817, filed Dec. 6, 2013; Ser. No. 14/097,581, filed Dec. 5, 2013; Ser. No. 14/093,981, filed Dec. 2, 2013; Ser. No. 14/093,980, filed Dec. 2, 2013; Ser. No. 14/082,573, filed Nov. 18, 2013; Ser. No. 14/082,574, filed Nov. 18, 2013; Ser. No. 14/082,575, filed Nov. 18, 2013; Ser. No. 14/082,577, filed Nov. 18, 2013; Ser. No. 14/071,086, filed Nov. 4, 2013; Ser. No. 14/076,524, filed Nov. 11, 2013; Ser. No. 14/052,945, filed Oct. 14, 2013; Ser. No. 14/046,174, filed Oct. 4, 2013; Ser. No. 14/016,790, filed Oct. 3, 2013; Ser. No. 14/036,723, filed Sep. 25, 2013; Ser. No. 14/016,790, filed Sep. 3, 2013; Ser. No. 14/001,272, filed Aug. 23, 2013; Ser. No. 13/970,868, filed Aug. 20, 2013; Ser. No. 13/964,134, filed Aug. 12, 2013; Ser. No. 13/942,758, filed Jul. 16, 2013; Ser. No. 13/942,753, filed Jul. 16, 2013; Ser. No. 13/927,680, filed Jun. 26, 2013; Ser. No. 13/916,051, filed Jun. 12, 2013; Ser. No. 13/894,870, filed May 15, 2013; Ser. No. 13/887,724, filed May 6, 2013; Ser. No. 13/852,190, filed Mar. 28, 2013; Ser. No. 13/851,378, filed Mar. 27, 2013; Ser. No. 13/848,796, filed Mar. 22, 2012; Ser. No. 13/847,815, filed Mar. 20, 2013; Ser. No. 13/800,697, filed Mar. 13, 2013; Ser. No. 13/785,099, filed Mar. 5, 2013; Ser. No. 13/779,881, filed Feb. 28, 2013; Ser. No. 13/774,317, filed Feb. 22, 2013; Ser. No. 13/774,315, filed Feb. 22, 2013; Ser. No. 13/681,963, filed Nov. 20, 2012; Ser. No. 13/660,306, filed Oct. 25, 2012; Ser. No. 13/653,577, filed Oct. 17, 2012; and/or Ser. No. 13/534,657, filed Jun. 27, 2012, and/or U.S. provisional applications, Ser. No. 61/942,568, filed Feb. 19, 2014; Ser. No. 61/935,485, filed Feb. 4, 2014; Ser. No. 61/935,057, filed Feb. 3, 2014; Ser. No. 61/935,056, filed Feb. 3, 2014; Ser. No. 61/935,055, filed Feb. 3, 2014; Ser. 61/931,811, filed Jan. 27, 2014; Ser. No. 61/919,129, filed Dec. 20, 2013; Ser. No. 61/919,130, filed Dec. 20, 2013; Ser. No. 61/919,131, filed Dec. 20, 2013; Ser. No. 61/919,147, filed Dec. 20, 2013; Ser. No. 61/919,138, filed Dec. 20, 2013, Ser. No. 61/919,133, filed Dec. 20, 2013; Ser. No. 61/918,290, filed Dec. 19, 2013; Ser. No. 61/915,218, filed Dec. 12, 2013; Ser. No. 61/912,146, filed Dec. 5, 2013; Ser. No. 61/911,666, filed Dec. 4, 2013; Ser. No. 61/911,665, filed Dec. 4, 2013; Ser. No. 61/905,461, filed Nov. 18, 2013; Ser. No. 61/905,462, filed Nov. 18, 2013; Ser. No. 61/901,127, filed Nov. 7, 2013; Ser. No. 61/895,610, filed Oct. 25, 2013; Ser. No. 61/895,609, filed Oct. 25, 2013; Ser. No. 61/879,837, filed Sep. 19, 2013; Ser. No. 61/879,835, filed Sep. 19, 2013; Ser. No. 61/878,877, filed Sep. 17, 2013; Ser. No. 61/875,351, filed Sep. 9, 2013; Ser. No. 61/869,195, filed. Aug. 23, 2013; Ser. No. 61/864,835, filed Aug. 12, 2013; Ser. No. 61/864,836, filed Aug. 12, 2013; Ser. No. 61/864,837, filed Aug. 12, 2013; Ser. No. 61/864,838, filed Aug. 12, 2013; Ser. No. 61/856,843, filed Jul. 22, 2013, Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/842,644, filed Jul. 3, 2013; Ser. No. 61/840,542, filed Jun. 28, 2013; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/833,080, filed Jun. 10, 2013; Ser. No. 61/830,375, filed Jun. 3, 2013; Ser. No. 61/830,377, filed Jun. 3, 2013; Ser. No. 61/825,752, filed May 21, 2013; Ser. No. 61/825,753, filed May 21, 2013; Ser. No. 61/823,648, filed May 15, 2013; Ser. No. 61/823,644, filed May 15, 2013; Ser. No. 61/821,922, filed May 10, 2013; Ser. No. 61/819,835, filed May 6, 2013; Ser. No. 61/819,033, filed May 3, 2013; Ser. No. 61/816,956, filed Apr. 29, 2013; Ser. No. 61/815,044, filed Apr. 23, 2013; Ser. No. 61/814,533, filed Apr. 22, 2013; Ser. No. 61/813,361, filed Apr. 18, 2013; Ser. No. 61/810,407, filed Apr. 10, 2013; Ser. No. 61/808,930, filed Apr. 5, 2013; Ser. No. 61/806,674, filed Mar. 29, 2013; Ser. No. 61/772,015, filed Mar. 4, 2013 and/or Ser. No. 61/772,014, filed Mar. 4, 2013, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. patent application Ser. No. 13/202,005, filed Aug. 17, 2011, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and 6,824,281, and/or International Publication Nos. WO 2010/099416; WO 2011/028686; and/or WO 2013/016409, and/or U.S. Pat. Publication No. US 2010-0020170, and/or U.S. patent application Ser. No. 13/534,657, filed Jun. 27, 2012, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. patent application Ser. No. 13/260,400, filed Sep. 26, 2011, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,965,336; and/or 7,720,580, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149; and/or 7,526,103, which are all hereby incorporated herein by reference in their entireties, a rain sensor, such as the types disclosed in commonly assigned U.S. Pat. Nos. 6,353,392; 6,313,454; 6,320,176; and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent applications, Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. Publication No. US-2006-0061008, and/or U.S. patent application Ser. No. 12/578,732, filed Oct. 14, 2009, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036; and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system of a vehicle, said vision system comprising:
   a camera disposed behind a windshield of a vehicle equipped with said vision system, said camera comprising a lens and an imaging array;
   wherein said camera views forward of the equipped vehicle and through the windshield of the equipped vehicle;
   wherein said imaging array captures image data;
   wherein said imaging array comprises a two dimensional array of columns and rows of photosensing pixels;
   wherein said two dimensional array comprises a plurality of sub-arrays;
   wherein light is imaged at said plurality of sub-arrays via said lens of said camera;
   wherein a sub-array of said plurality of sub-arrays comprises a first pixel, a second pixel and a third pixel, and wherein said first pixel is adjacent to said second pixel and wherein said second pixel is adjacent to said third pixel;
   a deflection microsplitting spectral filter is disposed in front of said second pixel of said sub-array;
   wherein a deflection microsplitting spectral filter is not disposed in front of said first and third pixels of said sub-array;
   wherein light emanating from external the equipped vehicle and passing through the windshield is incident at said lens and passes through said deflection microsplitting spectral filter and is split so that (i) light within a first spectral band is imaged at said first pixel of said sub-array, (ii) light within a second spectral band is imaged at said second pixel of said sub-array and (iii) light within a third spectral band is imaged at said third pixel of said sub-array;
   a vehicle control having an image processor, wherein said image processor is operable to process image data captured by said imaging array; and
   wherein, responsive at least in part to processing of captured image data by said image processor, said control is operable to control a driver assistance system of the equipped vehicle.

2. The vision system of claim 1, wherein said first, second and third pixels are linearly arranged along one of (i) a row of photosensing pixels of said imaging array and (ii) a column of photosensing pixels of said imaging array.

3. The vision system of claim 1, wherein said first and third spectral bands comprise a red colored spectral band.

4. The vision system of claim 3, wherein said second spectral band comprises a non-red colored spectral band.

5. The vision system of claim 1, wherein light emanating from external the equipped vehicle and passing through the windshield comprises white light.

6. The vision system of claim 1, wherein a second deflection microsplitting spectral filter is disposed in front of a fourth pixel of another sub-array of said plurality of sub-arrays, and wherein light emanating from external the equipped vehicle and passing through the windshield is incident at said lens and passes through said second deflection microsplitting spectral filter and is split so that (i) light within a fourth spectral band is imaged at said fourth pixel of said sub-array, (ii) light within a fifth spectral band is imaged at a fifth pixel of said sub-array and (iii) light within a sixth spectral band is imaged at said third pixel of said sub-array.

7. The vision system of claim 6, wherein said first deflection microsplitting spectral filter comprises a red light deflector and wherein said second deflection microsplitting spectral filter comprises a non-red light deflector.

8. The vision system of claim 7, wherein said first and third spectral bands comprise a red colored spectral band and wherein said second spectral band comprises a non-red colored spectral band.

9. The vision system of claim 8, wherein said fifth and sixth spectral bands comprise a cyan colored spectral band.

10. The vision system of claim 1, wherein said driver assistance system comprises at least one of (i) a headlamp control system of the equipped vehicle, (ii) a lane departure warning system of the equipped vehicle, (iii) an adaptive cruise control system of the equipped vehicle, (iv) a traffic sign recognition system of the equipped vehicle, (v) a forward collision warning system of the equipped vehicle, (vi) a collision mitigation braking system of the equipped vehicle, (vii) an automatic emergency braking system of the equipped vehicle, (viii) a pedestrian detection system of the equipped vehicle, (ix) an object detection system of the equipped vehicle, (x) a traffic driving control system of the equipped vehicle and (xi) a video display system of the equipped vehicle.

11. A vision system of a vehicle, said vision system comprising:
   a camera disposed behind a windshield of a vehicle equipped with said vision system, said camera comprising a lens and an imaging array;
   wherein said camera views forward of the equipped vehicle and through the windshield of the equipped vehicle;
   wherein said imaging array captures image data;
   wherein said imaging array comprises a CMOS two dimensional array of columns and rows of photosensing pixels;
   wherein said two dimensional array comprises a plurality of sub-arrays;
   wherein light is imaged at said plurality of sub-arrays via said lens of said camera;
   wherein a sub-array of said plurality of sub-arrays comprises a first pixel, a second pixel and a third pixel, and wherein said first pixel is adjacent to said second pixel and wherein said second pixel is adjacent to said third pixel;

a deflection microsplitting spectral filter is disposed in front of said second pixel of said sub-array;

wherein a deflection microsplitting spectral filter is not disposed in front of said first and third pixels of said sub-array;

wherein white light emanating from external the equipped vehicle and passing through the windshield is incident at said lens and passes through said deflection microsplitting spectral filter and is split so that (i) light within a first spectral band is imaged at said first pixel of said sub-array, (ii) light within a second spectral band is imaged at said second pixel of said sub-array and (iii) light within a third spectral band is imaged at said third pixel of said sub-array;

wherein said first and third spectral bands comprise a red colored spectral band and wherein said second spectral band comprises a blue-green colored spectral band;

a vehicle control having an image processor, wherein said image processor is operable to process image data captured by said imaging array; and wherein, responsive at least in part to processing of captured image data by said image processor, said control is operable to control a driver assistance system of the equipped vehicle.

12. The vision system of claim 11, wherein said first, second and third pixels are linearly arranged along one of (i) a row of photosensing pixels of said imaging array and (ii) a column of photosensing pixels of said imaging array.

13. The vision system of claim 11, wherein a second deflection microsplitting spectral filter is disposed in front of a fourth pixel of another sub-array of said plurality of sub-arrays, and wherein white light emanating from external the equipped vehicle and passing through the windshield is incident at said lens and passes through said second deflection microsplitting spectral filter and is split so that (i) light within a fourth spectral band is imaged at said fourth pixel of said sub-array, (ii) light within a fifth spectral band is imaged at a fifth pixel of said sub-array and (iii) light within a sixth spectral band is imaged at said third pixel of said sub-array.

14. The vision system of claim 13, wherein said fifth and sixth spectral bands comprise a non-red colored spectral band.

15. The vision system of claim 11, wherein said driver assistance system comprises at least one of (i) a headlamp control system of the equipped vehicle, (ii) a lane departure warning system of the equipped vehicle, (iii) an adaptive cruise control system of the equipped vehicle, (iv) a traffic sign recognition system of the equipped vehicle, (v) a forward collision warning system of the equipped vehicle, (vi) a collision mitigation braking system of the equipped vehicle, (vii) an automatic emergency braking system of the equipped vehicle, (viii) a pedestrian detection system of the equipped vehicle, (ix) an object detection system of the equipped vehicle, (x) a traffic driving control system of the equipped vehicle and (xi) a video display system of the equipped vehicle.

16. A vision system of a vehicle, said vision system comprising:

a camera disposed behind a windshield of a vehicle equipped with said vision system, said camera comprising a lens and an imaging array;

wherein said camera views forward of the equipped vehicle and through the windshield of the equipped vehicle;

wherein said imaging array captures image data;

wherein said imaging array comprises a two dimensional array of columns and rows of photosensing pixels;

wherein said two dimensional array comprises a plurality of sub-arrays;

wherein light is imaged at said plurality of sub-arrays via said lens of said camera;

wherein a sub-array of said plurality of sub-arrays comprises a first pixel, a second pixel and a third pixel, and wherein said first pixel is adjacent to said second pixel and wherein said second pixel is adjacent to said third pixel;

wherein said first, second and third pixels are linearly arranged along one of (i) a row of photosensing pixels of said imaging array and (ii) a column of photosensing pixels of said imaging array;

a deflection microsplitting spectral filter is disposed in front of said second pixel of said sub-array;

wherein a deflection microsplitting spectral filter is not disposed in front of said first and third pixels of said sub-array;

wherein white light emanating from external the equipped vehicle and passing through the windshield is incident at said lens and passes through said deflection microsplitting spectral filter and is split so that (i) light within a first spectral band is imaged at said first pixel of said sub-array, (ii) light within a second spectral band is imaged at said second pixel of said sub-array and (iii) light within a third spectral band is imaged at said third pixel of said sub-array;

a vehicle control having an image processor, wherein said image processor is operable to process image data captured by said imaging array;

wherein, responsive at least in part to processing of captured image data by said image processor, said control is operable to control a driver assistance system of the equipped vehicle; and wherein said driver assistance system comprises at least one of (i) a headlamp control system of the equipped vehicle, (ii) a lane departure warning system of the equipped vehicle, (iii) an adaptive cruise control system of the equipped vehicle, (iv) a traffic sign recognition system of the equipped vehicle, (v) a forward collision warning system of the equipped vehicle, (vi) a collision mitigation braking system of the equipped vehicle, (vii) an automatic emergency braking system of the equipped vehicle, (viii) a pedestrian detection system of the equipped vehicle, (ix) an object detection system of the equipped vehicle, (x) a traffic driving control system of the equipped vehicle and (xi) a video display system of the equipped vehicle.

17. The vision system of claim 16, wherein said first and third spectral bands comprise a red colored spectral band and wherein said second spectral band comprises a non-red colored spectral band.

18. The vision system of claim 16, wherein a second deflection microsplitting spectral filter is disposed in front of a fourth pixel of another sub-array of said plurality of sub-arrays, and wherein light emanating from external the equipped vehicle and passing through the windshield is incident at said lens and passes through said second deflection microsplitting spectral filter and is split so that (i) light within a fourth spectral band is imaged at said fourth pixel of said sub-array, (ii) light within a fifth spectral band is imaged at a fifth pixel of said sub-array and (iii) light within a sixth spectral band is imaged at said third pixel of said sub-array.

19. The vision system of claim 18, wherein said first deflection microsplitting spectral filter comprises a red light deflector and wherein said second deflection microsplitting spectral filter comprises a non-red light deflector.

20. The vision system of claim 19, wherein said fifth and sixth spectral bands comprise a cyan colored spectral band.

* * * * *